United States Patent
Kohlammer et al.

(10) Patent No.: US 6,316,568 B1
(45) Date of Patent: Nov. 13, 2001

(54) CROSSLINKABLE PROTECTIVE COLLOIDS FOR USE IN THE POLYMERIZATION OF UNSATURATED MONOMERS

(75) Inventors: Klaus Kohlammer, Marktl; Gerhard Koegler, Burgkirchen; Monika Rockinger, Unterneukirchen; Walter Dobler, Tann, all of (DE)

(73) Assignee: Wacker-Chemie GmbH, Munich (DE)

(*) Notice: Subject to any disclaimer, the term of this patent is extended or adjusted under 35 U.S.C. 154(b) by 0 days.

(21) Appl. No.: 09/142,235

(22) PCT Filed: Mar. 6, 1997

(86) PCT No.: PCT/EP97/01136

§ 371 Date: Sep. 3, 1998

§ 102(e) Date: Sep. 3, 1998

(87) PCT Pub. No.: WO97/32904

PCT Pub. Date: Sep. 12, 1997

(30) Foreign Application Priority Data

Mar. 7, 1996 (DE) .............................. 196 08 911

(51) Int. Cl.$^7$ .................................................. G08F 12/30
(52) U.S. Cl. ..................... 526/287; 526/240; 526/304; 526/303.1; 524/558; 524/376; 524/458; 524/460; 524/556; 524/560; 524/522; 524/523
(58) Field of Search .................................. 526/240, 287, 526/304, 303.1; 524/558, 376, 458, 460, 556, 560, 522, 523

(56) References Cited

U.S. PATENT DOCUMENTS

| | | |
|---|---|---|
| 4,044,197 | 8/1977 | West et al. . |
| 4,736,005 * | 4/1988 | Castner .................. 526/229 |
| 5,314,943 | 5/1994 | Steinwand . |
| 5,385,971 | 1/1995 | Sauer et al. . |

FOREIGN PATENT DOCUMENTS

| | | |
|---|---|---|
| 2540468 | 3/1977 | (DE) . |
| 2512589 | 5/1984 | (DE) . |
| 4212768 | 10/1993 | (DE) . |
| 4304014 | 8/1994 | (DE) . |
| 0 029 970 * | 6/1981 | (EP) . |
| 0029970 | 6/1981 | (EP) . |
| 0094898 | 12/1986 | (EP) . |
| 0261378 | 3/1988 | (EP) . |
| 0205862 | 11/1993 | (EP) . |
| 2003769 | 11/1969 | (FR) . |
| 1253450 | 11/1971 | (GB) . |
| 1551126 | 8/1979 | (GB) . |
| 2 099 833 * | 12/1982 | (GB) . |
| 2099833 | 12/1982 | (GB) . |
| 9203482 | 3/1992 | (WO) . |
| 9418249 | 8/1994 | (WO) . |

OTHER PUBLICATIONS

Ullmanns Encyklopadie der technischen chemie, 4th edition, vol. 10, Verlag Weinheim 1980, chapter "emulsions".
G. Schulz, Die Kunststoffe, C. Hanser Verlag, 1964 table of contents.
J.C. Jonson, Emulsifiers and Emulsifying Techniques, Noyes Data Corp., Park Ridge, New Jersey: 1979, table of contents.
Derwent Abstract corresponding to DE 4304014 #94–255940.
Derwent Abstract corresponding to WO 92/03482 #92–073061.

* cited by examiner

*Primary Examiner*—David W. Wu
*Assistant Examiner*—Ling-Siu Choi
(74) *Attorney, Agent, or Firm*—Brooks & Kushman P.C.

(57) ABSTRACT

A water-soluble, crosslinkable protective colloid is provided having a weight-average molecular weight of least than 500,000 comprising: a) 20 to 95% by weight of monomer units containing sulphonic acid or sulphonate groups, b) 4 to 80% by weight of monomer units containing N-methylol or N-alkoxymethyl groups, and c) 0.1 to 20% by weight of hydrophobic monomer units such as water insoluble ethylenically unsaturated compounds and the hydrophobic end groups of initiator radicals or regulator molecules. Optionally, up to 50% by weight of the monomer units containing sulphonic acid or sulphonate groups can be replaced by monomer units containing carboxyl groups or monomer units containing amide groups.

3 Claims, No Drawings

CROSSLINKABLE PROTECTIVE COLLOIDS FOR USE IN THE POLYMERIZATION OF UNSATURATED MONOMERS

BACKGROUND OF THE INVENTION

The invention relates to crosslinkable protective colloids, processes for the polymerization of ethylenically unsaturated monomers using the crosslinkable protective colloids, and polymers and polymer dispersions obtainable with these, and their use.

The stabilization of polymer dispersions with protective colloids and surfactants is known. An overview of the customary stabilizers is to be found, for example, in G. Schulz "Die Kunststoffe" [Plastics], C. Hanser Verlag, 1964, or in J. C. Jonson "Emulsifiers and Emulsifying Techniques" Noyes Data Corp., Park Ridge, N.J., 1979, and in Ullmann, "Encylkopädia der technischen Chemie" [Encyclopaedia of Industrial Chemistry], 4th edition, Volume 10, Verlag Weinheim, 1980.

These compounds are distinguished by a hydrophilic and a hydrophobic part in the molecule, the latter serving for anchoring in the polymer resin. It is generally assumed that these surface-active substances are chiefly located at the interface between the polymer particles and the aqueous liquor. These stabilizers thus greatly influence the total surface area of the system and therefore in the end also the profile of properties of a polymer dispersion. The choice of a suitable emulsifying auxiliary thus ultimately determines the desired final properties of a polymer dispersion.

The use of surface-active polymers as protective colloids is also often described in the more recent patent literature. In a departure from the conventional polymeric protective colloids, such as polyvinyl alcohol, cellutose derivatives or gelatin, new synthesis routes are taken here, and water-soluble polymers with ionic groups, so-called polyelectrolytes, are employed as protective colloids.

An unsaturated polyester of maleic or fumaric acid polyethylene glycol ester which is used for stabilizing emulsion polymers is known from DE 4212786 (U.S. Pat No. 5385971). The polymer dispersions prepared with these are distinguished by good stability to frost and electrolytes. DE-A 4304014 (WO-A 94/18249) describes a process for the continuous polymerization of acrylic polymers with a low degree of polymerization in an aqueous medium. The polymers thus obtained are suitable as dispersing similarities for pigments and of binders. However, a disadvantage of these products is a certain thickener action, which is undesirable for many applications.

The stabilization of dispersion with poly-electrolytes is also known from DE 2540468 (GB-A 1551126), in which a good stability in respect of exposure to salts and shear is attributed to the resulting dispersion. WO-A 92/03482 describes oligomeric carboxylic acids as stabilizers for emulsion polymerization of monomers which can be polymerized by free radicals, which are said to be particularly suitable for the preparation of binders for printing inks. Binder dispersions for textile uses are claimed in U.S. Pat No. 5314943. The polymer dispersions described therein are stabilized by means of a protective colloid containing carboxylic acids groups. Fast setting properties are attributed to them.

Aqueous polymer dispersion of crosslinkable polymers are often employed for the preparation of binders which lead to very stable polymer films, for example in the use as adhesives or coating compositions. Crosslinkable polymers with N-methylol-functional commoner units as crosslinker groups are widely used. Such crosslinkable polymers are known, for example, from DE-C 2512589 (U.S. Pat. No. 4044197). However, the strength of the polymer films obtainable with these cannot be increased without problems by increasing the content of N-methylol-functional units in the polymer. It is therefore proposed in the prior art to increase the crosslinking action of such polymers by special preparation processes (EP-B 205862) or to polymerize commoners with a blocked N-methylol function (EP-A 261378).

Against this prior art, there was therefore the object of providing polymers or aqueous polymer dispersions which form polymer films of high mechanical strength and high resistance to water and solvents.

The object has been achieved by providing a water-soluble, crosslinkable polymer with protective colloid properties which has functional groups which are capable of auto-crosslinking, in particular N-methylol groups, incorporated into the molecular chain.

Water-soluble polymers of high NMA content tend to have high molecular weights with a correspondingly high viscosity of the aqueous solution. Water-soluble acrylic compounds, such as acrylic acid or N-methylol-acrylmide, which is customary as a crosslinking agent, in fact tend towards very high degrees of polymerization, which severely impedes widespread use because of the resulting high viscosities. For example, EP-B 94898 (US-A 4736005) describes the preparation of very high molecular weight (MW<1,000,000) terpolymers of 30 to 95% of dimethylacrylamide (DMA), 0.1 to 10% of N-methylolacrylaamide (NMA) and 4 to 50% of acrrylamidomethylpropanesulphonate (AMPS) and their use as rheological additives in crude oil production. Another disadvantage of polyelectrolytes based on water-soluble monomers is that such polyelectrolytes are often incompatible with a polymer dispersion and the aqueous polyelectrolyte solution separates out from the polymer dispersion as a serum.

BRIEF SUMMARY OF THE INVENTION

Surprisingly, it has been found that by copolymerization of N-methylolarcylamide with acrylic compounds containing sulphonic acid or sulphonate groups, significantly lower molecular weights can be achieved. It has furthermore been found, surprisingly, that significantly lower surface tensions and lower viscosities already result by copolymerization of only small amounts of hydrophobic commoners.

The invention relates to water-soluble, crosslinkable protective colloids having a molecular weight of $\leq 500,000$ comprising a) at least 20% by weight of monomer units containing sulphonic acid or sulphonate groups.

b) 4 to 80% by weight of monomer units containing N-methylol or N-alkoxymethyl groups.

c) 0.1 to 20% by weight of hydrophobic monomer units from the group consisting of water-soluble, ethylenically unsaturated compounds and the hydrophobic end groups of initiator radicals or regulator molecules, the contents in % by weight being based on the total weight of the copolymer, and it being possible, where appropriate, for up to 50% by weight, based on the weight content of monomer units a), of the content of monomer units containing sulphonic acid/sulphonate groups to be replaced by monomer units d) containing carboxyl groups or monomer units e) containing amide groups.

Water-soluble, crosslinkable protective colloids having a molecular weight of $\leq 500,000$ comprising a) 30 to 87% by weight of monomer units containing sulphonic acid or sulphonate groups,
b) 12 to 60% by weight of monomer units containing N-methylol or N-alkoxymethyl groups,
c) 0.1 to 10% by weight of hydrophobic monomer units from the group consisting of water-insoluble, ethylenically unsaturated compounds and the hydrophobic end groups of initiator radicals or regulator molecules, the contents in % by weight being based on the total weight of the copolymer, are preferred.

Water-soluble, crosslinkable protective colloids having a molecular weight of $\leq 500{,}000$ comprising
a) 70 to 87% by weight of monomer units containing sulphonic acid or sulphonate groups,
b) 12 to 25% by weight of monomer units containing N-methylol or N-alkoxymethyl groups,
c) 1 to 5% by weight of hydrophobic monomer units from the group consisting of water-insoluble, ethylenically unsaturated compounds and the hydrophobic end groups of initiator radicals or regulator molecules, the contents in % by weight being based on the total weight of the copolymer, are particularly preferred.

Suitable monomer units a) are, for example, water-soluble, ethylenically unsaturated compounds which can be polymerized by free radicals and contain sulphonic acid or sulphonate groups —$SO_3M$, where M=H or alkali metal, ammonium or alkaline earth metal ion. 2-Acrylamido-2-methylpropanesulphonic acid (AMPS), styrene-sulphonic acid, (meth)acrylic acid sulphoalkyl esters, itaconic acid sulphoalkyl esters, preferably in each case with a $C_1$- to $C_6$-alkyl radical, vinylsulphonic acid and ammonium, alkali metal or alkaline earth metal salts thereof are preferred. 2-Acrylamido-2-methylpropane-sulphonic acid (AMPS), styrenesulphonic acid, sulpho-propyl acrylate, sulphopropyl itaconate, vinylsulphonic acid and ammonium, sodium, potassium and calcium salts thereof are particularly preferred.

Suitable monomer units b) are, for example, water-soluble ethylenically unsaturated compounds which can be polymerized by free radicals and contain N-methylol groups (—NH—$CH_2OH$) or etherified derivatives thereof (—NH—$CH_2OR$, where R=$C_1$- to $C_6$-alkyl). N-Methylolarcrylamide (NMA), N-methylolmethacrylamide (NMMA), N-(isobutoxymethyl)-acrylamide (IBMA), N-(isobutoxymethyl)-methacrylamide and N-(n-butoxymethyl)- acrylamide (NBMA) are preferred. N-Methylolacrylamide and N-(isobutoxymethyl)-acrylamide are particularly preferred.

Suitable monomer units c) are ethylenically unsaturated compounds which can be (co)polymerized by free radicals and are soluble in water to the extent of less than 2% by weight at 23° C., and hydrophobic end groups of initiator radicals or regulator molecules having in each case more than 8 C atoms. Esters of acrylic acid or methacrylic acid having more than 3 C atoms, such as methyl methacrylate, vinylaromatics, such as styrene or vinyltoluene, olefins, such as ethylene or propylene, vinyl halides, such as vinyl chloride, and vinyl esters of aliphatic carboxylic acids having more than 2 C atoms are preferred. The dodecyl radical of dodceylmercaptan is preferred as an end group of regulator molecules. Methyl methacrylate, styrene, vinyl propionate, isoprenyl acetate (1methylvinyl acetate), vinyl laurate and vinyl esters of α-branded monocarboxylic acids having 5 to 10 C atoms, such as VeoVa9® or VeoVal0®, are particularly preferred.

Suitable monomers d) containing carboxyl groups are water-soluble, ethylenically unsaturated compounds which can be polymerized by free radicals and contain carboxyl groups —COOM, where M=M or alkali metal, ammonium or alkaline earth metal ions. Acrylic acid, methacrylic acid, crotonic acid and itaconic acid are preferred. Suitable monomers e) containing amide groups are water-soluble, ethylenically unsaturated compounds which can be polymerized by free radicals and contain amide groups —$CONH_2$. Acrylamide and methacrylamide are preferred, and acrylamide is particularly preferred.

Water-soluble here generally means that the solubility in water at 23° C. is at least 10% by weight. The molecular weight is stated as the weight-average, determined by means of gel permeation methods (GPC) against sodium polystyrene-sulphonate standards.

The protective colloids according to the invention are preferably prepared by free radical polymerization in aqueous solution at a reaction temperature of preferably 40° C. to 80° C. The polymerization can be carried out by initially introducing all or individual constituents of the reaction mixture, or by initially introducing a portion and topping up the constituents or individual constituents of the reaction mixture, or by the metering process without an initial mixture.

The initiation is carried out by means of the customary water-soluble agents which form free radicals, which are preferably employed in amounts of 0.01 to 3.0% by weight, based on the total weight of the monomers. Examples of these are ammonium and potassium persulphate, hydrogen peroxide and potassium, sodium and ammonium peroxodiphosphate. If appropriate, the said initiators which form free radicals can also be combined in a known manner with 0.01 to 1.0% by weight, based on the total weight of the monomers, of reducing agents, it being possible for the polymerization to be carried out at lower temperatures in this case. Alkali metal formalde-hyde sulphoxylates and ascorbic acid; for example, are suitable. In the case of redox initiation, preferably one or both redox catalyst components are metered in here during the polymerization.

The pH range desired for the polymerization, which is in general pH $\geq 2.5$, can be established in a known manner by bases or customary buffer salts, such as alkali metal phosphates or alkali metal carbonates. To adjust the molecular weight, the regulators usually used, for example mercaptans, aldehydes and chlorohydrocarbons, can be added during the polymerization.

In a particularly preferred embodiment, some of the mixture of commoners a), b), c) and, if appropriate, d) and e) is initially introduced as an aqueous solution and the initial mixture is heated to the reaction temperature. When the polymerization temperature has been reached, the free radical initiator and the remaining commoner mixture, in each case in aqueous solution, are slowly metered in. After the end of the metering, the polymerization is brought to completion by heating the mixture of 85° C. to 95° C.

In the most preferred embodiment, at least a portion of the commoners a) containing sulphonate groups, in general 5 to 60% by weight, based on the total weight of the commoners a), and a portion of the N-methylol-functional commoners b), in general 5 to 60% by weight, based on the total weight of the commoners a), are initially introduced as an aqueous solution and the remaining amount of commoners a) and b) is metered in.

The copolymers are preferably used in the form of their aqueous solutions. Solids contents of 15 to 25% by weight are preferably established, depending on the uses.

The invention furthermore relates to processes for the preparation of aqueous polymer dispersions stabilized with protective colloids by free radical polymerization of ethylenically unsaturated monomers by the suspension or emulsion polymerization process, characterized in that the polymerization is carried out in the presence of one or more protective colloids having a molecular weight of ≦500,000 comprising a) at least 20% by weight of monomer units containing sulphonic acid or sulphonate groups, b) 4 to 80% by weight of monomer units containing N-methylol or N-alkoxymethyl groups, c) 0.1 to 20% by weight of hydrophobic monomer units from the group consisting of water-insoluble, ethylenically unsaturated compounds and the hydrophobic end groups of initiator radicals or regulator molecules, the contents in % by weight being based on the total weight of the copolymer, and it being possible, where appropriate, for up to 50% by weight, based on the weight content of monomer units a), of the content of monomer units containing sulphonic acid/sulphonate groups to be replaced by monomer units d) containing carboxyl groups or monomer units e) containing amide groups.

The polymerization is carried out in the presence of one or more monomers from the group consisting of vinyl esters of unbranched or branched carboxylic acids having 1 to 18 C atoms, esters of acrylic acid and methacrylic acid with unbranched or branched alcohols having 1 to 18 C atoms, vinylaromatics, vinyl halides and olefins.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 5 to 9 to 10 C. atoms, for example VV5®,VeoVA9® or VeoVa10 ®. Vinyl acetate is particularly preferred.

Preferred methacrylic acid esters or acrylic acid esters are methyl acrylate, methyl methacrylate, ethyl acrylate, ethyl methacrylate, propyl acrylate, propyl methacrylate, n-butyl acrylate, n-butyl methacrylate, isobutyl, acrylate, isobutyl methacrylate, t-butyl acrylate, t-butyl methacrylate, 2- ethylhexyl acrylate and 2-ethylhexyl methacrylate. Methyl acrylate, methyl methacrylate, n-butyl acrylate and 2-ethylhexyl acrylate are particularly preferred.

Preferred vinylaromatics are styrene, α-methyl-styrene, o-chlorostyrene or vinyltoluenes.

Preferred vinyl halides are vinyl chloride and vinylidene chloride.

Preferred olefins are ethylene, propylene, 1,3-butadiene and isoprene.

If appropriate, 0.05 to 30.0% by weight, preferably 0.5 to 15% by weight, in each case based on the total weight of the monomers, of one or more auxiliary monomers can also be added to improve the water-solubility, for crosslinking or for modification of the adhesion properties of the polymers.

Suitable auxiliary monomers for improving the water-solubility are, for example, α,β-monoethylenically unsaturated mono- and dicarboxylic acids and amides thereof, such as scrylic acid, methacrylic acid, maleic acid, fumaric acid, itaconic acid, acrylamide and methacrylamide; and ethylenically unsaturated sulphonic acids and salts thereof, preferably vinylsulphonic acid, 2-acrylamido-propanesulphonate and/or N-vinyl pyrrolidone.

Monomers having a crosslinking action are preferably employed to the extent of 0.5 to 5.0% by weight, based on the total weight of the monomers. Examples of these are N-methylolacrylamide and N-methylolmethacrylamide; N-(alkoxymethyl)acrylamides or N-(alkoxymethyl)-methacrylamides with a $C_1$- to $C_6$-alkyl radical, such as N-(isobutoxymethyl)-acrylamide (IBMA), N-(isobutoxymethyl)-methacrylamide (IBMMA), N-(n-butoxymethyl)-acrylamide (NBMA) and N-(n-butoxymethyl)-methacrylamide (NBMMA); and polyethylenically unsaturated commoners, such as ethylene glycol discrylate, 1,3-butylene glycol diacrylate, 1,4-butylene glycol diacrylate, propylene glycol diacrylate, divinyl adipate, divinylbenzene, vinyl methacrylate, vinyl acrylate, allyl methacrylate, allyl acrylate, diallyl maleate, diallyl phthalate, diallyl fumarate, methylenbisacrylaide, cyclopentadienyl acrylate or triallyl cyanurte.

Commoner units which are suitable for modification of the adhesion properties are, for example, methacrylic acid hydroxyalkyl and acrylic acid hydroxy-alkyl esters, such as hydroxyethyl, hydroxypropyl or hydroxybutyl acrylate or methacrylate, and compounds such as diacentoneadrylamide and acetylacetoxyethyl acrylate or methacrylate.

The aqueous polymer dispersion are prepared by the process of aqueous emulsion polymerization or by the process of aqueous suspension polymerization in the presence of 0.1 to 20% by weight, preferably 0.1 to 5.0% by weight, of one or more of the crosslinkable protective colloids according to the invention, in each case based on the total weight of the monomers. The preparation is preferably carried out by the emulsion polymerization process, which is explained in more detail below.

The polymerization temperature is as a rule 35–95° C., preferably 40–80° C. The polymerization can be carried out in the batch process, all the components being initially introduced into the reactor, and by the metering process, one or more components being added during the polymerization. Mixed types with an initial mixture and metering are preferred. The meterings can be carried out separately (spatially and with respect to time) or some or all of the components to be metered can be metered in pre-emulsified form.

The crosslinkable protective colloids can be initially introduced or metered or divided among an initial mixture and metering. The crosslinkable protective colloids are preferably metered into the mixture in the form of their aqueous solutions. The meterings can be carried out at a constant rate and at varying rates. The same provisos as for the use of the other reaction components apply to the use of the initiator system.

If, for example, gaseous reaction component are to be employed, the emulsion polymerization can also be carried out under increased pressure. If the polymerization is carried out under pressure, for example if the monomers vinyl chloride or ethylene are employed, pressures of 5 bar to 100 bar are preferred. The target amount of ethylene which is to be copolymerized, for example, is decisive.

The crosslinkable protective colloids to be used according to the invention can be employed both by themselves and in combination with emulsifiers and/or other protective colloids. In a preferred embodiment, one or more emulsifiers are also additionally employed in addition to the crosslinkable protective colloid according to the invention.

Possible concomitant emulsifiers are anionic, cationic and also nonionic emulsifiers. If the polymerization is carried out in the presence of emulsifiers, the amount thereof is preferably up to 4% by weight, based on the total weight of the monomer phase. Anionic and nonionic emulsifiers are preferably employed. Customary emulsifiers are, for example, ethoxylated fatty alcohols with a $C_8$-$C_{36}$-alkyl radical and a degree of ethoxylation (EO) degree) of 3 to 50; ethyoxylated mono-, di- and trialkylphenols with $C_4$-$C_{10}$-alkyl radical and an EO degree of 3 to 50; alkali metal salts of di-$C_4$-$C_{12}$ -alkyl esters of sulphosuccinic acid. Alkali metal and ammonium salts of $C_8$-$C_{12}$-alkyl sulphates, of ethyxylated alkanols with a $C_{12}$-$C_{18}$-alkyl radical and an EO degree of 3 to 30, of ethoxylated $C_4$-$C_{10}$-alkylphenols with an EO degree of 3 to 50, of $C_{12}$-$C_{18}$-alkylsulphonic acids, of $C_9$-$C_{18}$-alkylarylsulphonic acids and of sulphonates of ethoxylated, linear and branched $C_8$-$C_{36}$-alkyl alcohols with an EO degree of 3 to 50 are also suitable.

Suitable protective colloids which can be employed, if appropriate, in addition to the crosslinkable protective colloids according to the invention are polyvinyl alcohols, partly hydrolysed polyvinyl acetates and cellulose ethers, such as methyl, methylhydroxy-propyl- and hydroxyethyl-cellulose and carboxymethyl-cellutoses.

The initiation of the polymerization is carried out with the water-soluble, thermal initiators or redox-initiator combinations customary for emulsion polymerization. Examples of thermal initiators are organic peroxides, such as tert-butyl hydroperoxide or cumyl hydroperoxide, or peroxdisulphates, such as potassium peroxodisulphate or ammonium peroxodisulphate, or $H_2O_2$ or azo compounds, such as azodiisobutyronitrile. Redox initiators which are preferably used are hydrogen peroxide, tert-butyl hydroperoxide, potassiym peroxodisulphate or ammonim peroxodisulphate, in combination with hydroxymethanesulphinic acid, ascorbic acid or sodium sulphate as the reducing agent. The reactivity of the initiator system is expediently increased by addition of metal ions which can exist in seveal valency states. $Fe^{2+}$ or $Ce^{2+}$ ions are preferably used. The amount of initiator is preferably 0.01 to 1.0% by weight, based on the total weight of the monomer phase.

Regulating substances can be employed during the polymerization to control the molecular weight. They are usually employed in amount of between 0.01 and 5.0% by weight, based on the mo nomers to be polymerized, and are metered seperately or else as a premix with reaction components. Examples of such substances are dodecyl-nercaptan, mercaptopropionic acid, methyl mercaptopropionate, isopropanol and acetaldehyde.

The aqueous dispersions obtainable with the process according to the invention have a solids content of 30 to 75% by weight, preferably 40 to 65% by weight.

The invention furthermore relates to aqueous polymer dispersons of polymers of ethylenically unsaturated monomers which comprise 0.1 to 20% by weight, based on the solids content of polymer, of the crosslinkable protective colloid according to the invention.

These polymer dispersions can be prepared by the procedure according to the invention just discussed. Furthermore, the aqueous polymer dispersions according to the invention can also be prepared by a proceudre in which 0.1 to 20% by weight, preferably 0.1 to 5% by weight, of the crosslinkable protective colloid according to the invention, in each case based onthe solids content of polymer, is added to conventionally prepared polymer dispersions. In the case of subsequent addition, the protective colloid according to the invention can be added in solid form; it is preferably admixed as an aqueous solution.

Polymer dispersions of the following polymers are preferred;

Preferred vinyl ester polymers comprise as monomer units, in each case based on the total weight of the polymer:
  50 to 100% by weight of vinyl ester, in particular vinyl acetate;
  50 to 95% by weight of vinyl ester, in particular vinyl acetate, and 5 to 50% by weight of vinyl ester, in particular vinyl acetate, and by 5 to 50% by weight of α-olefin, in particular ethylene;
  20 to 79% by weight of vinyl ester, in particular vinyl acetate, and 1 to 30% by weight of ethylene and 20 to 49% by weight of vinyl chloride;
  50 to 75% by weight of vinyl acetate, 1 to 30% by weight of vinyl laurate or vinyl ester of an α-branched carboxylic acid, in particular versatic acid vinyl ester, and 5 to 40% by weight of ethylene;
  70 to 99% by weight of vinyl acetate and 1 to 30% by weight of vinyl laurate or vinyl ester of an α-branched carboxylic acid, in particular versatic acid vinyl ester, 70 to 99% by weight of vinyl ester, in particular vinyl acetate, and 1 to 30% by weight of acrylic acid ester, in particular n-butyl acrylate or 2-ethylhexyl acrylate;
  50 to 75% by weight of vinyl acetate, 1 to 30% by weight of acrylic acid ester, in particular n-butyl acrylate or 2-ethylhexyl acrylate, and 5 to 40% by weight of ethylene; or
  30 to 75% by weight of vinyl acetate, 1 to 30% by weight of vinyl laurate or vinyl ester of an α-branched carboxylic acid, in particular versatic acid vinyl ester, 1 to 30% by weight of acrylic acid ester, in particular n-butyl acrylate or 2-ethylehexyl acrylate, and 5 to 40% by weight of ethylene.

Preferred (meth)acrylic acid ester polymers comprise as monomer units, in each case based on the total weight of the polymer: 35 to 65% by weight of methyl methacrylate, 65 to 35% by weight of n-butyl acrylate and/or 2-ethylhexyl acrylate; or 35 to 65% by weight of styrene and 65 to 35% by weight of n-butyl acrylate and/or 2-ethylhexyl acrylate.

Vinyl ester polymers and (meth)acrylic acid ester polymers of the compostion mentioned which also comprise 0.5 to 5.0% by weight, based on the total weight of the polymers, of comonomer units which have a crosslinking action from the group consisting of N-methylolacrylamide and N-methylolmethacrylamide; and N-(alkoxymethyl)acrylamides and N-(alkoxymethyl)methacrylamides having a $C_1$- to $C_6$alkyl radical, such as N-(isobutoxymethyl)acrylamide (NBMA), N-(isobutoxymethyl)-methacrylamide (IBMMA), N-(n-butoxymethyl)-acrylamide (NBMA) and N-(n-butoxy-methyl) methacrylamide (NBMMA), are particularly preferred.

Vinyl acetate/ethylene copolymers having an ethylene content of 5 to 50% by weight and a content of 0.5 to 6.0% by weight of one or more coomonomers from the group consisting of N-methylolacrylamide, N-methylolmethacrylamide, N-(isobutoxymethyl)-acrylamide (IBMA), N-(isobutoxymethyl)-methacrylamide (IBMMA), N-(n-butoxy-methyl-acrylamide (NBMA) and N-(n-butoxymethyl)-meth-acrylamide (NBMMA), are most preferred.

The said aqueous polymer dispersions of polymers of ethylenically unsaturated monomers which comprise 0.1 to 20% by weight, based on the solids content of polymer, of the crosslinkable protective colloid according to the invention are also suitable for the preparation of polymer powders which are redisperible in water.

To prepare the redispersible polymer powder compositions, the aqeous dispersions are dried. The dispersions are preferably spray dried or freeze dried.

Spray drying of the dispersions is most preferred. The known devices can be used here, such as, for example, spraying through one- two- or multi-component nozzles or with a rotating disc, in a stream of dry gas, preferably air, which is heated if appropriate. Temperatures above 250° C. are in general not used as the intake temperature of the dry gas. The discharge temperatures of dry gas are in general in the range from 45 to 100° C., preferably 55 to 90° C., depending on the unit, composition of the polymer and desired degree of drying.

For drying, the dispersions are adjusted to a solids content of 10 to 75% by weight, preferably 30 to 65% by weight. The solids content depends on the drying process chosen and on the nature and amount of other additives which are added during drying. For the preferred spray drying, a viscosity of the total system of up to 1000 mPa.s has proved suitable.

For example, spraying aids can be added to the dispersion before drying. They are preferably added in the form of aqueous solutions thereof, in amounts of preferably 5 to 40% by weight, in particular 5 to 20% by weight, based on the polymer. The optimum amount depends on the stabilization of the dispersion, the glass transistion temperature of the polymer contained therein and the desired properties of the powder.

Suitable spraying aids are, inter alia, by themselves or in combination, degraded or modified starches, starch derivatives, cellulose derivatives and water-soluble polymers, in particular those having high glass transition temperatures of at least 50° C. Examples of such polymers, which are in many cases commercially available, are: vinyl alcohol copolymers (polyvinyl alcohol) having a degree of hydrolysis of 85 to 94% mol and a Höppler viscosity, determined in 4% strength solution, of 3 to 25 mPa.s; water-soluble sulphonate group-containing condensates of melamine and formaldehyde or naphthalene and formaldehyde; phenolsulphonic acid-formaldehyde condensates; copolymers of styrene and maleic acid and/or itaconic acid and esters thereof; and water-soluble copolymers of olefinically unsaturated acids and alkenes.

A content of up to 1.5% by weight of antifoam, based on the base polymer, has proved favourable in many cases during the spraying. Liquid antifoams are usually added to the dispersion before drying, and solid anti-foams can be mixed into the dry dispersion powder composition.

To increase the storage stability by improving the stability to blocking, in particular in powders of low glass transition temperature, an antiblocking agent (anticaking agent), preferably in an amount of up to 30% by weight, based on the total weight of polymeric constitutents, can be added to the resulting powder. This is preferably done as long as this powder is still finely divided, for example still suspended in the dry gas. In particular, the antiblocking agent is metered separately, but at the same time as the dispersion, into the drying device. Examples of antiblocking agents are finely ground aluminium silicates, kieselguhr, colloidal silica gel, pyrogenic silicic acid, precipitated silicic acid, micro-silica, ground gypsum, kaolin, talc, cements, diatomaceous earth, calcium carbonate or magnesium hydrosilicate.

The polymer dispersions according to the invention comprising crosslinkable protective colloids or the dispersion powders obtainable therefrom are suitable as binders for coatings, plasters and coverings, in particular paints; as adhesives or binders for wood, paper, textiles and nonwovens; as binders in papermaking and for the production of compression moulding compositions and shaped articles; and and as binders for use in the building industry, in particular as additives to concrete, building adhesives, mortars, filling compositions and flow control compositions.

EXAMPLES

Example 1

Preparation of an approximately 16% strength AMPS-NMA-MMA polymer solution:

Preparation of the monomer metering solution: 459 g of water are initially introduced into a suitable metering vessel and the following substances are dissolved in succession: 81.5 g of a 25% strength NaOH solution, 0.849 g of mercaptopropionic acid MPA, 4.18 g of methyl methacrylate, 180 g of 2-acrylamido-2-methyl-propanesulphonic acid AMPS and 69.5 g of a 45% strength N-methylolacrylamide solution NMA. The following are initially introduced in succession into a 3l laboratory reactor equuipped with a blade stirrer, reflux condenser and suitable metering devices: 1.28 kg of deionized water, 54.4 g of a 25% strength NaOH solution, 0.849 g of mercaptopropionic acid MPA, 112 g of solid 2-acrylamido-2-methyl-propanesulphonic acid AMPS, 36.2 g of a 45% strength N-methylolacrylamide solution NMA and 2.62 g of methyl methacrylate. The solution is stirred and heated up to 80° C. The polymerization is started by metering in a 2.2% strength ammonium persulphate solution APS over a period of 3 h. 10 minutes after the start of the APS solution, the monomer metering solution described above is metered in over a period of 2 hours. The polymerization is then brough to completion at 90° C. After cooling, the solution is brought to pH=7 with NaOH. The clear solution thus prepared has a solids content of 16.1%, a pH of 7, a viscosity of 88 mPas (Brookfield, 20 rpm) and an average molecular weight of 162,000 (GPC; against Na polystyrene-sulphonate standards), and the surface tension of the 5% strength aqueous solution is 57.5 mNm.

Example 2

Preparation of an apaproximately 16% strength AMPS-NMA-STY polymer solution:

Preparation of the monomer metering solution: 459 g water are initially introduced into a suitable metering vessel and the following substances are dissolved in succession: 81.5 g of a 25% strength NaOH solution, 0.849 g of mercaptopropionic acid MPA, 4.18 g of styrene, 180 g of 2-acrylamido-2-methylpropane-sulphonic acid AMPS and 69.5 g of a 45% strength N-methylolacrylamide solution NMA. The following are initially introduced in succession into a 3 l laboratory reactor equipped with a blade stirrer, reflux condenser and suitable metering devices: 1.28 kg of deionized water, 54.4 g of a 25% strength NaOH solution, 0.849 g of mercapptopropionic acid MPA, 112 g of solid 2-acrylamido-2-methyl-propanesulphonic acid AMPS, 36.2 g of a 45% strength N-methylolacrylamide solution NMA and 2.62 g of styrene. The solution is stirred and heated up to 80° C. The polymerization is started by metering in a 2.2% strength ammonium persulphate solution APS over a perios of 3 h. 10 minutes after the start of the APS solution, the monomer metering solution described above is metered in over a periods of 2 hours. The polymerization is then brough to completion at 90° C. After cooling, the solution is brough to pH=7 with NaOH. The clar solution has thus prepared has a solids content of 15.8%, a pH of 7, a viscosity of 48 mPas (Brookfield, 20 rpm) and an average molecular weight of 450,000 (GPC; against Na polystyrene-sulphonate standards), and the surface tension of the 5% strength aqueous solution is 61.6 mNm.

Example 3

Preparatoin of an approximately 16% strength AMPS-NMA polymer solution with hydrophobic dodecyl end groups.

Preparation of the monomer metering solution: 455 g of water are initially introduced into a suitable metering vessel and the following substances are dissolved in succession: 80.9 g of a 25% strength NaOH solution, 0.843 g of mercaptopropionic acid MPA, 179 g of 2-acrylamido-2-methylpropanesulphonic acid AMPS and 68.9 g of a 45% strength N-methylolacrylamide solution NMA. Preparation of the regulator metering solution: 5.39 g of dodecylmercaptan are dissolved in 48.5 g of acetone in a suitable metering vessel. The following substances are initially introduced in succession into a 3 l laboratory reactor equipped with a blade stirrer, reflux condenser and suitable metering devices: 1.21 kg of deionized water, 53.9 g of a 25% strength NaOH solution, 12.1 g of acetone, 0.843 g of mercaptopropionic acid MPA, 111 g of solid 2-acrylamido-2-methylpropanesulphonic acid AMPS and 36.0 g of a 45% strength N-methylolacrylamide solution NMA, and 1.35 g of dodecylmercaptan. The solution is stirred and heated up to 80° C. The polymerization is started by metering in a 2.2% strength ammonium persulphate solution APS over a period of 3 hours. 10 minutes after the start of the AOS solution, the monomer metering solution described above and the regulator metering solution are metered in over a period of 2 hours. The polymerization is then brought to completion at 90° C. After cooling, the solution is brought to pH=7 with NaOH. The clear solution thus prepared has a solids content of 16.3%, a pH of 7, a viscosity of 49.5 mPas (Brookfield, 20 rpm) and an average molecular weight of 148,000 (GPC, against Na polystyrene-sulphonate standards), and the surface tension of the 5% strength aqueous solution is 63.9 mNm.

Example 4

Preparation of an approximately 55% strength ethylene/vinyl acetate dispersion with the polymer from Example 1 as a protective colloid.

Preparation of the monomer metering solution: 633 g of vinyl acetate and 32.4 g of butyl acrylate are mixed in a metering vesel. Preparation of the aqueous metering solution: 26.6 g of deeionized water are initially introduced into a metering vessel and 2.94 g of 2-acrylamido-2-methylporpanesulphonic acid (Na salt, 50% strength solution in water), 32.8 g of a 48% strength N-methylolacrylamide solution, 11 g of an i-tridecyl alcohol polyglycol ether, 5.52 g of acrylic acid and 91.4 g of the 16.1% strength aqueous polymer solution from Example 1 are dissolved therein in successions, and the solution is stirred. The following substances are initially introduced in succession into a 2 l laboratory autoclave equipped with a stirrer and suitable metering devices: 521 g of deionized water, 2.77 g of a 25% strength Na vinylsulphonate solution, 1.15 g of a 30% strength solution of a sulphosuccinate half-ester, 10.7 g of a 40% strength solution of an ethylene oxide/propylene oxide/ethylene oxide block copolymer, 2.21 g of a 48% strength N-methylolacrylamide solution, 7.36 g of butyl acrylate and 63.3 g of vinyl acetate. After the contents of the autoclave have heated to 45° C., an ethylene pressure of 60 bar is applied and the polymerization is started by means of a 5% strength ammonium persulphate and a 2.5% strength ascorbic acid solution. The metering rates of the initiator meterings are adjusted to correspond to a total metering time of 6 hours. The start of the polymerization is indicated by exothermic evolution of heat. 10 minutes after the start of the reaction, metering of the monomers and metering of the aqueous emulsifier are started. The metering rates are in each case chosen to correspond to a metering time of 4 hours. When polymerization is complete, the reactor is let down and the pH brough to about 5. The speck-free polymer dispersion thus prepared is characterized as follows: solids content: 56.1% pH: 4.9, particle size about 440 nm, viscosity: 2980 mPas (Brookfield 20 rpm), ethylene content of the polymer resin: 21.8% by weight, degree of crosslinking of the polymer film: 81.3%.

Example 5

Preparation of an approximately 55% strength ethylen/vinyl acetate dispersion with the polymer from Example 2 as a protective colloid.

Preparation of the monomer metering soluiton: 633 g of vinyl acetate and 32.4 g of butyl acrylate are mixed in a metering vessel. Preparation of the aqueous metering soluiton: 42 ml of deionized water are initially introduced into a metering vessel and 2.94 g of 2-acrylamido-2-methylpropanesulphonic acid (Na salt, 50% strength solution in water), 32.8 g of an i-tridecyl alcohol polyglycol ether, 5.52 g of acrylic acid and 91.4 g of the 15.8% strength aqueous polymer solution from Example 2 are dissolved therein in succession, and the solution is stirred. The following substances are initially introduced in succession into a 2 l laboratory autoclave equipped with a stirrer and suitable metering devices: 521 g of deionized water, 2.77 g of a 25% strength Na vinylsulphonate solution, 1.15 g of a 30% strength solution of a sulphosuccinate half-ester, 10.7 g of a 40% strength solution of an ethylene oxide/porpylene oxide/ethylene oxide block copolymer, 2.21 g of a 48% strength N-methlolacrylamide solution, 7.36 g of butyl acrylate and 63.3 g of vinyl acetate. After the contents of the autoclave have heated to 45° C., an ethylene pressure of 60 bar is applied and the polymerization is started by means of a 5% strength ammonium persulphate and a 2.5% strength ascorbic acid solution. The metering rates of the initiator meterings are adjusted to correspond to a total metering time of 6 hours. The start of the polymerization is indicated by exothermic evolution of heat. 10 minutes after the start of the reaction, metering of the monomers and metering of the aqueous emulsifier are started. The metering rates are in each case chosen to correspond to a metering time of 4 hours. When polymerization is complete, the reactor is let down and the pH is brought to about 5. The speck-free polymer dispersion thus prepared is characterized as follows: solids content: 55:2%, pH: 4.8, particle size about 330 nm, viscosity: 5450 mPas (Brookfield 20 rpm), ethylene content of the polymer resin: 17.0% by weight, degree of crosslinking of the polymer film: 73.1%.

Example 6

Preparation of an approximately 55% strength ethylene/vinyl acetate dispersion with the polymer from Example 3 as a protective colloid.

Preparation of the monomer metering solution: 633 g of vinyl acetate and 32.4 g of butyl acrylate are mixed in a metering vessel. Preparation of the aqueous metering solution: 42 ml of deionized water are intially introduced into a metering vessel and 2.94 g of 2- acrylamido-2-methylpropanesulphonic acid (Na salt, 50% strength solution in water), 32.8 g of a 48% strength N-methlolacrylamide solution, 11 g of an i-tridecyl alcohol polyglycol ether, 5.52 g of acrylic acid and 90.3 g of the 16.3% strength aqueous polymer solution from Example 3 are dissolved therein in succession, and the solution is stirred. The following substances are initially introduced in succession into a 2 l laboratory autoclave equipped with a stirrer and suitable metering devices: 526 g of deionized water, 2.77 g of a 25% strength Na vinylsulphonate solution, 1.15 g of a 30% strength solution of a sulphosuccinate half-ester, 10.7 g of a 40% strength solution of an ethylene oxide/propylene oxide/ethylene oxide block copolymer, 2.21 g of a 48% strength N-methylolacrylamide solution, 7.36 g butyl acrylate and 63.3 g of vinyl acetate. After the contents of the autoclave have heated to 45° C., an ethylene pressure of 60 bar is applied and the polymerizataion is started by means of a 5% strength ammonium persulphate and a 2.5% strength ascorbic acid solution. The metering rates of the initiator meterings are adjusted to correspond to a total metering time of 6 hours. The start of the polymerization is indicated by exothermic evolution of heat. 10 minutes after the start of the reaction, metering of the monomers and metering of the aqueous emulsifier are started. The metering rates are in each case chosen to correspond to a metering time of 4 hours. When polymerization is complete, the reactor is let down and the pH is brough to about 5. The speck-free polymer dispersion thus prepared is characterized as follows: solids content: 55.1%, pH: 4.8, particle size about 320 nm, viscosity: 5150 mPas (Brookfield 20 rpm), ethylene content of the polymer resion: 21.6% by weight, degree of crosslinking of the polymer film: 88.7%.

Example 7 (comparison example)

Preparation of an approximately 55% strength ethylene/vinyl acetate dispersion without a protective colloid according to the invention.

The prepration was carried out analogously to Examples 4–6, but without one of the protective colloids according to the invention being employed. The speck-free polymer dispersion thus prepared is characterized as follows: solids content: 53.9%, pH: 4.7, particle size about 310 nm, viscosity: 1380 mPas (Brookfield 20 rpm), ethylene content of the polymer resin: 20.9% by weight, degree of crosslinking of the polymer film: 73.7%.

Use test:

Viscose staple tissues were impregnated with the polymer dispersions from Examples 4 to 1 , squeezed off and then dried at 150° C. for 3 minutes (binder application 29.5%). The strength of the nonwoven bonded in this way was tested in the transverse direction. The tests were carried out with the dry nonwoven and after storage in water or isopropanol for in each case 1 minute. For this, in each case 3 nonwoven stips 150 mm long were laid over one another over a width of 15 mm and tested together. The measurement conditions were as follows: clamped length 100 mm, clamped width 15 mm, measuring speed 100 mm/min. The maximum tensile force, that is to say the maximum tensile force reached within the context of the measurement, was documented as the measurement value. The results are summarized in Table I:

TABLE I

| Example | MTF (dry) [N] | MTF (water-wet) [N] | MTF (wet) (i-propanol) [N] |
|---|---|---|---|
| 4 | 19.0 | 9.8 | 5.9 |
| 5 | 20.6 | 11.6 | 8.0 |
| 6 | 21.6 | 11.9 | 7.7 |
| 7 (comparison) | 18.5 | 9.7 | 6.5 |

MTF = maximum tensile force; N = newtons

It can clearly be seen from Examples 4–6 on the one hand and Example 7 (comparison example without polyelectrolyte protective colloids according to the invention) that crosslinkable ethylene/vinyl acetate copolymers prepared with the crosslinkable protective colloids according to the invention show a significantly improved wet strength in water and solvent resistance in isopropanol compared with crosslinkable ethylene/vinyl acetate copolymers synthesized in the conventional manner.

What is claimed is:

1. Water-soluble, crosslinkable protective colloids having a weight-average molecular weight of <500,000 comprising
   a) 20 to 95% by weight of monomer units containing sulphonic acid or sulphonate groups,
   b) 4 to 80% by weight of monomer units containing N-methylol or N-alkoxymethyl groups,
   c) 0.1 to 30% by weight of at least one hydrophobic monomer unit selected from the group consisting of water-insoluble, ethylenically unsaturated compounds and the hydrophobic end groups of initiator radicals or regulator molecules, the contents in % weight being based on the total weight of the copolymer, and wherein optionally up to 50% by weight of monomer units a), containing sulphonic acid/sulphonate groups which are replaced by at least one monomer unit d) containing carboxyl groups or at least one monomer unit e) containing amide groups.

2. The water-soluble, crosslinkable protective colloids according to claim 1, which comprise
   a) 70 to 87% by weight of monomer units containing sulphonic acid or sulphonate groups,
   b) 12 to 25% by weight of hydrophobic monomer units containing N-methylol or N-alkoxymethyl groups.
   c) 1 to 5% by weight of hydrophobic monomer units from the group consisting of water-insoluble, ethylenically unsaturated compounds.

3. The water-soluble, crosslinkable protective colloids according to claim 1 which comprise, as monomer units a) at least one member selected from the groups consisting of 2-acrylamido-2-methyl-propanesulphonic acid, styrenesulphonic acid, sulpho-propyl acrylate, sulphopropyl itaconate, vinylsulphonic acid and ammonium, sodium, potassium and calcium salts thereof; as monomer units b) at least one member selected from the group consisting of N-methylolacrylamide, N-methylolmethacrylamide, N-(isobutoxymethyl)-acrylamide, N-(isobutoxymethyl)-metacrylamide and N-(n-butoxymethyl)-acrylamide; and as monomer units c), at least one member selected from the group consisting of methyl methacrylate, styrene, vinyl propionate, isopropenyl acetate, vinyl laurate and vinyl esters of α-branched monocarboxylic acids having 5 to 10 C atoms.

* * * * *

UNITED STATES PATENT AND TRADEMARK OFFICE
CERTIFICATE OF CORRECTION

PATENT NO. : 6,316,568 B1
DATED : November 13, 2001
INVENTOR(S) : Kohlhammer et al.

It is certified that error appears in the above-identified patent and that said Letters Patent is hereby corrected as shown below:

<u>Title page,</u>
Delete Inventor's name "Kohlammer" and insert -- Kohlhammer --.

<u>Column 14,</u>
Line 19, delete "0.1 to 30%" and insert -- 0.1 to 20% --.
Line 50, delete "metacrylamide" and insert -- methacrylamide --.

Signed and Sealed this

Thirteenth Day of August, 2002

*Attest:*

JAMES E. ROGAN
*Director of the United States Patent and Trademark Office*

*Attesting Officer*